(12) United States Patent
Moyes et al.

(10) Patent No.: US 12,547,550 B2
(45) Date of Patent: Feb. 10, 2026

(54) STORAGE INLINE ENCRYPTION CIRCUIT

(71) Applicants: ADVANCED MICRO DEVICES, INC., Santa Clara, CA (US); ATI TECHNOLOGIES ULC, Markham (CA)

(72) Inventors: William A. Moyes, Austin, TX (US); Carlos Javier Moreira, Markham (CA); Kathirkamanathan Nadarajah, Markham (CA); Keith Graham Shaw, Vancouver (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 355 days.

(21) Appl. No.: 18/129,305

(22) Filed: Mar. 31, 2023

(65) Prior Publication Data
US 2024/0330205 A1    Oct. 3, 2024

(51) Int. Cl.
*G06F 12/14* (2006.01)
*G06F 21/72* (2013.01)
*H04L 9/14* (2006.01)

(52) U.S. Cl.
CPC .......... *G06F 12/1408* (2013.01); *G06F 21/72* (2013.01); *H04L 9/14* (2013.01); *G06F 2212/1052* (2013.01)

(58) Field of Classification Search
CPC ......... G06F 12/1408; G06F 21/72; H04L 9/14
See application file for complete search history.

(56) References Cited

U.S. PATENT DOCUMENTS

| | | | |
|---|---|---|---|
| 10,176,122 B2* | 1/2019 | Kaplan | G06F 3/0673 |
| 12,271,327 B2* | 4/2025 | Guo | G06F 12/1009 |
| 2004/0003262 A1* | 1/2004 | England | G06F 12/1408 |
| | | | 713/189 |
| 2020/0042748 A1* | 2/2020 | Ives | G06F 21/79 |
| 2021/0014203 A1* | 1/2021 | Doshi | G06F 13/28 |
| 2021/0117340 A1* | 4/2021 | Trikalinou | H04L 9/0637 |
| 2022/0197825 A1* | 6/2022 | Dewan | G06F 21/6209 |

OTHER PUBLICATIONS

NVM Express, "NVM Express: Base Specification" Revision 1.4, 2016, 403 pages.

* cited by examiner

*Primary Examiner* — Shanto Abedin

(57) ABSTRACT

A processing system includes one or more storage encryption circuits (SIECs) interconnected with one or more input/output (I/O) devices and a system memory. Each SIEC is configured to encrypt and decrypt data as the data passes between the I/O devices and the system memory. To this end, an SIEC includes slots each associated with respective memory addresses of the system memory. Each slot provides an aperture to the associated memory addresses such that the I/O devices use these apertures to indirectly target the associated memory addresses. As the data targeting the memory addresses associated with an aperture passes through an SIEC, the SIEC encrypts or decrypts the data using cryptographic keys stored on the SIEC.

20 Claims, 8 Drawing Sheets

STORAGE INLINE ENCRYPTION CIRCUIT

BACKGROUND

To support the execution of applications, some processing systems include a system memory and input/output (I/O) devices each configured to store data used in the execution of instructions for the applications. Additionally, such processing systems frequently include elements such as input-output memory management units (IOMMUs) and buses to facilitate the transfer of data between the I/O devices and the system memory. To help increase the security of these processing systems, processing systems often encrypt the data stored in the I/O devices while storing unencrypted data in the system memory. To this end, some processing systems use the system software (e.g. operating system) executed by a processor of the processing system to encrypt data before it is stored in an I/O device and decrypt data after it is retrieved from the I/O device. Using such system software to encrypt and decrypt data requires the processing system to allocate resources to the system software to perform such encryption and decryption, which reduces the performance of the processing system.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
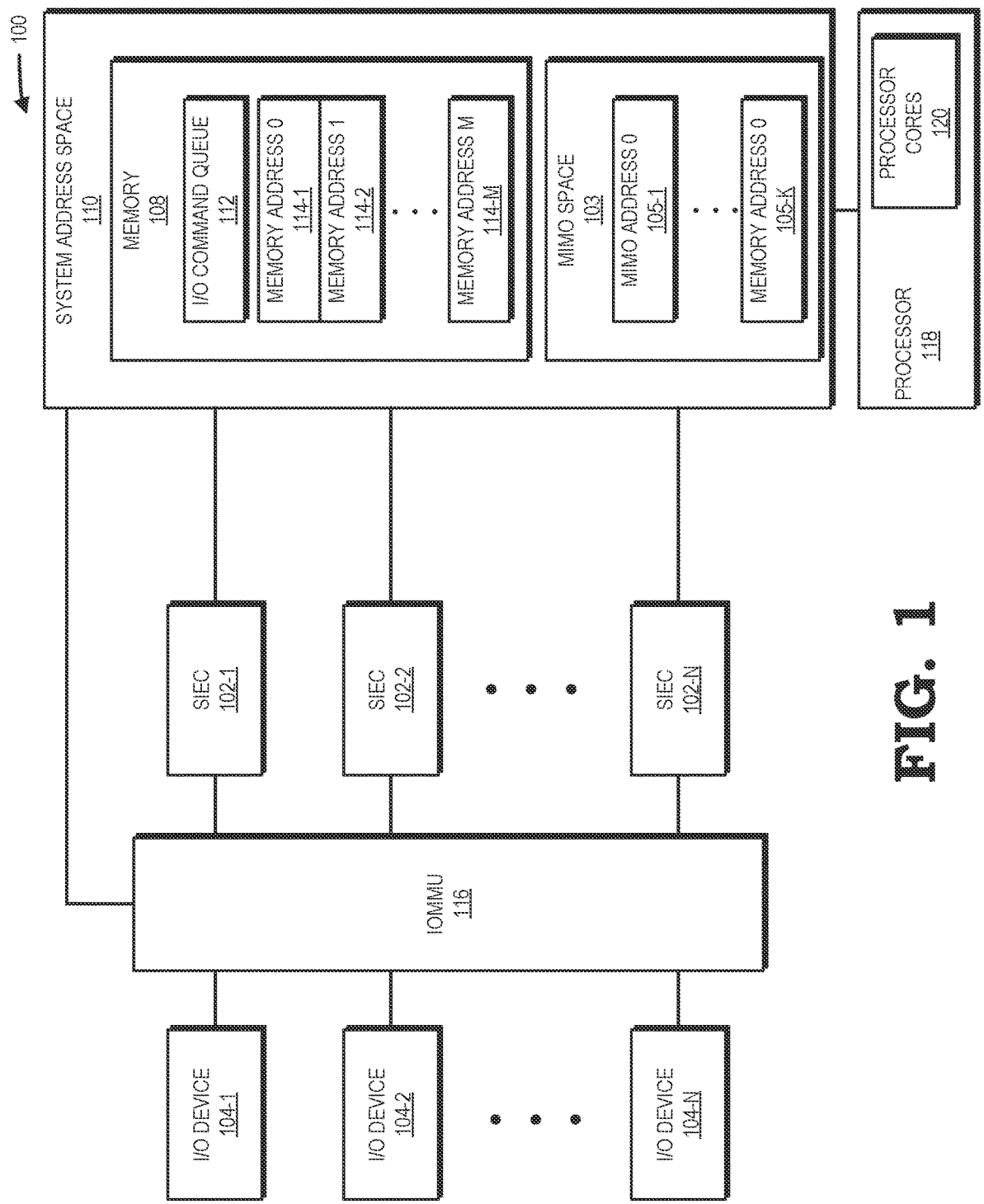
FIG. 1 is a block diagram of a processing system that includes one or more storage inline encryption circuits (SIECs) configured to encrypt and decrypt data passing between one or more input/output (I/O) devices and a memory, in accordance with some implementations.

Some processing systems include one or more input/output (I/O) devices (e.g., hard disk drives (HDDs), non-volatile memory devices, non-volatile memory express (NVMe) devices, solid-state drives (SSDs), flash memory devices) connected to a main memory (e.g., system memory) of the processing system by a bus and configured to read and write data to and from the main memory. To this end, the I/O devices (e.g., NVMe devices) within a processing system are configured to generate direct memory access (DMA) requests each including data indicating, for example, the I/O device that generated the DMA request (e.g., a requestor identifier (requester ID)), a memory command (e.g., read, write), a memory address (e.g., virtual address, guest physical address (GPA)) indicating a location of a memory (e.g., main memory, system memory), data to be written to the memory, or any combination thereof. As an example, an I/O device generates a DMA request indicating a read command and a memory address indicating a location of a main memory. As another example, an I/O device generates a DMA request indicating a write command, a memory address indicating a location of a main memory, and data to be written to the memory address. In implementations, an I/O device is configured to provide a DMA request to one or input-output memory management units (IOMMUs) included in or otherwise connected to the I/O device. The IOMMUs are configured to translate the memory address indicated in the DMA request from a virtual address (I/O virtual address (IOVA)) to a physical address (e.g., GPA), from a GPA to a system physical address (SPA), or both. After the address is translated, the IOMMU provides the DMA request to a memory controller of a memory (e.g., main memory, system memory) configured to manage (e.g., read, write, transfer) the data stored in the memory. For example, in response to receiving a DMA request indicating a write command, a translated memory address (SPA), and data to be written, the memory controller is configured to write the data to be written in a location of the memory indicated by the translated memory address. As another example, in response to receiving a DMA request indicating a read command and a translated memory address (SPA), the memory controller is configured to read data from a location of the memory indicated by the translated memory address and provide a command (e.g., completion packet) to write the data read from the memory to an I/O device (e.g., the I/O device that generated the DMA request).

To help increase the security of the processing system, data stored on the I/O devices is encrypted using one or more cryptographic keys. For example, the processing system is configured to encrypt data to be written to an I/O device using a cryptographic key (e.g., Advanced Encryption Standard (AES) key) before it is stored on the I/O device. Additionally, in some implementations, the processing system is configured to decrypt data read from an I/O device using a cryptographic key (e.g., AES key) before it is made available to consumers of the read data. To this end, in some implementations, a processing system includes system software (e.g., an operating system) configured to encrypt data before the data is stored on an I/O device, decrypt data read from I/O devices, or both. However, using system software to encrypt data before the data is stored on an I/O device, decrypt data read from I/O devices, or both requires that the encryption keys used to encrypt and decrypt the data are visible and accessible by the system software, decreasing the security of the processing system. For example, due to the encryption keys being visible to the system software, the encryption keys may become exposed to malicious entities during transient execution attacks on the processor executing the system software, allowing such malicious entities to decrypt the data stored on the I/O devices of the processing system. Additionally, such system software is executed by one or more processors of the processing system, which places greater burden on the processors due to the processors encrypting and decrypting the data for the system software rather than performing other operations, lowering the processing efficiency of the processing system. Further, in some implementations, the I/O devices themselves include circuitry (e.g., hardware-based circuitry, software-based circuitry) configured to encrypt data before the data is stored on an I/O device, decrypt data read from I/O devices, or both. However, encrypting and decrypting data at the I/O devices allows malicious entities to access the unencrypted data before it arrives at the I/O device or as it leaves the I/O device. For example, unencrypted data transmitted to and from an I/O device over a bus is exposed to bus interposers, allowing malicious entities to access the unencrypted data and decreasing the security of the processing system.

To this end, systems and techniques disclosed herein are directed to a processing system including one or more storage inline encryption circuits (SIECs). Such SIECs, for example, each include hardware-based circuitry, software-based circuitry, or both configured to encrypt and decrypt data as the data is transferred between a memory (e.g., main memory, system memory) of the processing system and one or more I/O devices. To encrypt and decrypt data to and from an I/O, an SIEC includes one or more slots each having a respective memory-mapped input/output (MMIO) address (e.g., an address in the same address space as a system memory of the processing system). Additionally, each slot of an SIEC is associated with a respective portion of the system memory such that each slot provides a respective window (e.g., aperture) to the respective portion of the system memory. As an example, a slot of an SIEC is associated with a portion (e.g., 4 kb portion) of the system memory such that the slot of the SIEC provides a window to that portion (e.g., 4 kb portion) of the system memory. Such a window, for example, allows an I/O device to read and write data to and from the portion of the system memory associated with the window. Further, each slot of an SIEC is associated with a control register of the SIEC that includes data indicating, for example, a memory address (e.g., IOVA) indicating the portion of system memory associated with a respective slot, a cryptographic key for encrypting or decrypting data received at a respective slot, an offset (e.g., xor-encrypt-xor-based tweaked-codebook mode with ciphertext stealing (XTS) offset) for encrypting or decrypting data, or any combination thereof.

In implementations, a processing system includes one or more SIECs interconnected with one or more I/O devices configured to store encrypted data and a memory (e.g., system memory) of the processing system configured to store unencrypted data. After an I/O device generates a DMA request including a memory address (e.g., IOVA) indicating a portion of the memory, the DMA request is received by an IOMMU included in or otherwise connected to the I/O device. The IOMMU then provides the DMA request to the slot of the SIEC associated with the respective portion of the memory indicated in the memory address by, for example, translating the memory address indicated in the DMA request based on data mapping memory addresses indicating a portion of the memory (e.g., IOVAs) to memory address indicating the slots of one or more SIECs. That is to say, the IOMMU translates the memory address of a DMA to a memory address indicating the slot of an SIEC based on data mapping memory addresses indicating a portion of the memory (e.g., IOVAs) to memory addresses indicating the slots of one or more SIECs. In response to receiving a DMA request at a respective slot, the SIEC then determines if the DMA request indicates a read or write command. If the DMA request indicates a write command, the SIEC, using a cryptographic key, offset, or both indicated by the control register associated with the slot that received the DMA request, decrypts the data to be written indicated in the DMA request. Additionally, based on data stored in the control register, the SIEC determines a memory address (e.g., GPA, SPA) indicating the portion of the memory associated with the slot, updates the DMA request with the decrypted data and determined memory address, and provides the updated DMA request to the memory. The memory then stores the decrypted data in an area of the memory based on the determined memory address (e.g., SPA) indicating a portion of memory. In this way, the SIEC allows data provided (e.g., on a bus) from the I/O devices to be encrypted and allows the data to be decrypted before the data is written to the memory of the processing system, reducing the risk that unencrypted data is exposed to, for example, bus interposers. Additionally, using an SIEC to perform inline decryption of the data from the I/O devices to the memory rather than system software increases the processing efficiency of the system as the processing system does not need to commit resources to the system software for decryption.

Further, if a DMA request received from an I/O device at a slot of the SIEC indicates a read command, the SIEC, based on data stored in a control register associated with the slot, determines a memory address (e.g., GPA) indicating the portion of the memory associated with the slot and updates the DMA request using the determined memory address. The SIEC then provides the updated DMA request to the memory. In response to receiving the updated DMA request, the memory reads out data from an area of the memory based on the determined memory address (e.g., GPA) and generates a completion packet indicating the read out data (e.g., read out unencrypted data). The memory then provides the completion packet to a slot of the SIEC (e.g., the slot that provided the updated DMA request to the memory). In response to receiving the completion packet from the memory at a slot, the SIEC encrypts the data (e.g., read out data) indicated in the completion packet based on a cryptographic key, offset, or both indicated in a control register associated with the slot and provides the encrypted completion packet with the encrypted data to the I/O device. As such, the SIEC also allows data provided (e.g., on a bus) from the memory to be encrypted before the data is written to an I/O device, reducing the risk that unencrypted data is exposed to, for example, bus interposers. Additionally, using an SIEC rather than system software to perform encryption of the data from the memory to the I/O devices increases processing efficiency as no resources of the processing system are used by the system software to encrypt the data.

FIG. 1 illustrates a processing system 100 that includes one or more storage inline encryption circuits (SIECs) 102 configured to encrypt and decrypt data passing between one or more input/output (I/O) devices 104 and a memory 108, in accordance with some implementations. According to implementations, the processing system 100 is generally configured to execute sets of instructions (e.g., computer programs) to carry out tasks on behalf of an electronic device. Accordingly, in different implementations the processing system 100 is part of any of a variety of electronic devices. For purposes of description, it is assumed that the processing system 100 is part of an electronic device, for example, a server, a desktop computer, a laptop computer, a tablet computer, and the like. In implementations, processing system 100 is configured to support and execute multiple virtual machines (VMs) concurrently. Such VMs, for example, are configured to execute one or more applications each including sets of instructions and corresponding operations to be performed. To perform these sets of instructions and corresponding operations, the processing system 100 includes processor 118, memory 108, and one or more input/output (I/O) devices 104. Processor 118 includes any of a variety of parallel processors, vector processors, coprocessors, graphics processing units (GPUs), general-purpose GPUs (GPGPUs), non-scalar processors, highly parallel processors, AI processors, network processors, inference engines, machine learning processors, other multithreaded processing units, scalar processors, serial processors, or any combination thereof. For example, processor 118 includes a general-purpose processor, such as a central processing unit (CPU) that includes hardware structures configured to retrieve and execute sets of instructions. Additionally, in some implementations, processor 118 includes one or more programmable logic devices, for example, field-programmable gate arrays (FPGAs), complex programmable logic devices (CPLDs), and the like. According to implementations, processor 118 includes one or more processor cores 120 each configured to perform one or more operations for a set of instructions. For example, processor 118 includes one or more processor cores 120 that each operate as a compute unit. Such compute units each include one or more single instruction, multiple data (SIMD) units that perform the same operation on different data sets to produce one or more results (e.g., data resulting from the performance of one or more operations by one or more processor cores 120). In implementations, in response to performing one or more operations, one or more compute units (e.g., processor cores 120) of processor 118 are configured to store results of the operations (e.g., data resulting from the performance of the operations) in memory 108.

Memory 108 includes one or more memory devices configured to store and retrieve data based on commands (e.g., store and load commands) received from, for example, processor 118. Accordingly, in different implementations, memory 108 is random access memory (RAM), non-volatile memory (NVM), hard disk memory, Compute Express Link (CXL) memory, and the like, or any combination thereof. Additionally, in implementations, system address space 110 defines one or more memory addresses 114 within memory 108 used within processing system 100. For example, system address space 110 includes one or more memory addresses 114 each representing a respective portion of memory 108 used, for example, to read and write data to and from I/O devices 104. Though the example implementation presented in FIG. 1 presents system address space 110 including three memory addresses (114-1, 114-2, 114-M) representing an M number of memory addresses that each represent a respective portion of memory 108, in other implementations, system address space 110 can include any number of memory addresses 114 that each represents a respective portion of memory 108. Further, in implementations, system address space 110 includes a memory-mapped I/O (MMIO) space 103 that defines one or more MMIO addresses 105 used within processing system 100. As an example, system address space 110 includes a MMIO space 103 with one or more MMIO addresses 105 each representing one or more registers, slots, or both of one or more I/O devices 104. Though the example implementation presented in FIG. 1 presents the MMIO space 103 of system address space 110 as including two MMIO addresses (105-1, 105-K) representing a K number of MMIO addresses that each represents one or more registers, slots, or both of one or more I/O devices 104, in other implementations, the MMIO space 103 of system address space 110 can include any number of MMIO addresses 105 that each represents one or more registers, slots, or both of one or more I/O devices 104.

According to implementations, one or more I/O devices 104 of processing system 100 include, for example, any device that can, independent of the processor 118, process input information, output information, or a combination thereof on behalf of the processing system 100. As an example, one or more I/O devices 104 of processing system 100 include hard disk drives (HDDs), NVM devices, non-volatile memory express (NVMe) devices, solid-state drives (SSDs), flash memory devices, storage controllers (e.g., disc controllers, NVM controllers, NVMe controllers), or any combination thereof. For example, one or more I/O devices 104 each include an NVMe device and an NVMe controller. Such storage controllers, for example, include hardware-based circuitry, software-based circuitry, or both configured to manage the data stored on an I/O device. For example, a storage controller is configured to write data to an I/O device 104, read data from an I/O device, generate direct memory access (DMA) requests (e.g., memory requests) for an I/O device 104, or any combination thereof. Though the example implementation illustrated in FIG. 1 presents processing system 100 as including three I/O devices (104-1, 104-2, 104-N) representing an N number of I/O devices, in other implementations, processing system 100 can include any number of I/O devices.

In implementations, processor 118 (e.g., one or more processor cores 120 of processor 118) is configured to generate one or more command descriptors based on one or more instructions executed by processor 118. That is to say, in response to executing one or more instructions for one or more applications, one or more processor cores 120 of processor 118 are configured to generate a command descriptor for one or more I/O devices 104. A command descriptor, for example, includes data indicating a command (e.g., read, write), a location within memory 108 (e.g., a memory address), data to be written, or any combination thereof. For example, in implementations processor 118 is configured to execute one or more instructions for one or more applications executed by a VM. In response to executing an instruction for the application, processor 118 generates a command descriptor including data indicating a write command, a location within memory 108 (e.g., a memory address 114 of memory 108), and data to be written to the location within memory 108. In some implementations, one or more command descriptors include a memory address indicating a location within memory 108. For example, a command descriptor includes a virtual memory address indicating a location within memory 108 associated with a respective VM executing on processing system 100 (e.g., the VM that issued the instruction resulting in the command descriptor). In response to generating a command descriptor, processor 118 is configured to store the command descriptor in I/O command queue 112 (e.g., a submission queue, circular queue) stored in memory 108.

According to implementations, one or more I/O devices 104 are configured to access I/O command queue 112. To this end, for example, an I/O device is configured to generate a direct memory access (DMA) request (e.g., a read direct memory access request, a write direct memory access request). A DMA request includes, for example, data indicating the I/O device that generated the DMA request (e.g., a requestor identifier (requester ID)), a memory command (e.g., read, write), an address (e.g., virtual address, guest physical address (GPA)) of a memory (e.g., main memory, system memory), data to be written to the memory, or any combination thereof. As an example, to access I/O command queue 112, an I/O device generates a DMA request including a requester ID, a memory address indicating I/O command queue 112 (e.g., an IOVA indicating the location within memory 108 where I/O command queue 112 is stored), and a read command. To handle such DMA requests, processing system 100 includes one or more input-output memory management units (IOMMUs) 116 connected to each I/O device 104. Each IOMMU 116 includes hardware-based circuitry, software-based circuitry, or both configured to translate an address (e.g., IOVA, GPA) indicated in a DMA request to a physical memory address (e.g., system physical address (SPA)). For example, in implementations, processor 118 maintains a data structure (e.g., page table) that includes data mapping one or more IOVAs to GPAs, GPAs to SPAs, IOVAs to SPA, or any combination thereof. Though the example implementation presented in FIG. 1 presents processing system 100 including one IOMMU 116 connected to each I/O device 104, in other implementations processing system 100 can include any number of IOMMUs 116 each connected to any number of I/O devices 104.

In response to receiving a DMA request (e.g., memory request) to access I/O command queue 112 from an I/O device 104 (e.g., a DMA request including a requester ID of the I/O device 104, a memory address indicating I/O command queue 112, and a read command), IOMMU 116 is configured to translate the address (e.g., IOVA) indicated in the DMA request to an SPA indicating the location within memory 108 where I/O command queue 112 is stored. After translating the memory address, IOMMU 116 provides the DMA request to the translated memory address (e.g., the SPA indicating the location within memory 108 where I/O command queue 112 is stored). In response to receiving the DMA request, memory 108 (e.g., a memory controller of memory 108) reads out one or more command descriptors of the I/O command queue 112 and provides the read out command descriptors to the I/O device 104 that generated the DMA request. According to implementations, after receiving one or more command descriptors from I/O command queue 112, an I/O device 104 is configured to generate one or more DMA requests to fulfill the received command descriptor. For example, in response to receiving a command descriptor indicating a write command, data to be written, and a memory address (e.g., IOVA) indicating a location within memory 108, an I/O device 104 is configured to generate a DMA request indicating, for example, data indicating the I/O device 104, a write command, the data to be written, and the memory address (e.g., IVOA). As another example, in response to receiving a command descriptor indicating a read command and a memory address (e.g., IOVA) indicating a location within memory 108, an I/O device 104 is configured to generate a DMA request indicating, for example, a read command, and the memory address (e.g., IOVA).

In implementations, the data stored on each I/O device 104 is encrypted using one or more encryption algorithms (e.g., advanced encryption standard (AES), triple data encryption standard (3DES), International Data Encryption Algorithm (IDEA)). To facilitate the encryption and decryption of data being written to and read out of the I/O devices 104, processing system 100 includes one or more SIECs 102. These SIECs 102 are each connected between one or more I/O devices 104 and memory 108 and include hardware-based circuitry, software-based circuitry, or both configured to encrypt and decrypt data as the data is transferred between memory 108 and one or more I/O devices. To this end, an SIEC 102 includes one or more slots each having a respective MMIO address 105 within the MMIO space 103 of system address space 110. Additionally, each slot of an SIEC 102 is associated with a respective memory address 114 each representing a respective portion of memory 108 such that each slot provides a respective window (e.g., aperture) to the memory address 114 (e.g., window to the respective portion of memory 108 represented by the memory address). For example, a slot of an SIEC 102 is associated with a memory address 114 representing a portion (e.g., 4 kb portion) of memory 108 such that the slot of the SIEC 102 provides a window to that portion (e.g., 4 kb portion) of the memory 108. Though the example implementation presented in FIG. 1 shows processing system 100 as having three SIECs (102-1, 102-2, 102-N) representing an N number of SIECs 102, in other implementations, processing system 100 can include any number of SIECs 102.

To facilitate one or more SIECs 102 encrypting and decrypting data between one or more I/O devices 104 and memory 108, an I/O device 104 is configured to provide the DMA request to IOMMU 116. For example, an I/O device 104 is configured to provide a DMA request generated in response to receiving a command descriptor from I/O command queue 112 to IOMMU 116. IOMMU 116, for example, is configured to translate the memory address (e.g., IOVA) indicating a location in memory 108 of the DMA request to a memory address indicating the slot of an SIEC 102. For example, the IOMMU 116 is configured to translate the memory address (e.g., IOVA) indicating a location in memory 108 of the DMA request to a memory address of the slot of an SIEC 102 associated with the same location in memory 108 (e.g., providing a window to that location in memory 108). To this end, IOMMU 116 is configured to translate the memory address (e.g., IOVA) indicating a location in memory 108 of the DMA request using a data structure (e.g., page table) that maps one or more virtual addresses (e.g., IOVAs) to one or more respective slots of the SIECs 102. Such a data structure, for example, is maintained by the system software (e.g., operating system) of processing system 100 executed by processor 118 (e.g., by one or more processor cores 120 of processor 118). In implementations, if the memory address (e.g., IOVA) indicated in a DMA request does not map to one or more slots of an SIEC 102 (e.g., does not map to a memory address 114 associated with a slot of an SIEC 102), IOMMU 116 is configured to translate the memory address (e.g., IOVA) to an SPA and provides the DMA request with the translated memory address to memory 108. That is to say, if the memory address (e.g., GPA) indicated in a DMA request does not map to one or more slots of an SIEC 102, IOMMU 116 translates the memory address of the DMA request such that the DMA request bypasses the SIECs 102. For example, in response to receiving a DMA request requesting access to I/O command queue 112, IOMMU 116 translates the memory address (e.g., IOVA) indicating I/O command queue 112 to an SPA such that the DMA request is received by memory 108 and bypasses the SIECs 102.

In response to receiving a DMA request from IOMMU 116 at a slot, an SIEC 102 is configured to determine whether the DMA request indicates a read or write command. If the DMA request indicates a write command, the SIEC 102 is configured to decrypt the data to be written indicated in the DMA request based on the slot on which the DMA request was received. For example, each SIEC 102 includes control registers with each control register of the SIEC 102 being associated with a respective slot of the SIEC 102. Each control register, for example, includes data indicating a cryptographic key (e.g., AES key), offset (XTS offset), and a memory address (e.g., GPA) indicating the memory address 114 associated with a respective slot (e.g., a memory address 114 indicating the portion of memory 108 to which the slot provides a window). Based on the cryptographic key, offset, or both indicated in the control register associated with a slot, the SIEC 102 is configured to decrypt the data to be written indicated in the DMA request received at the slot. For example, the SIEC 102 decrypts the data to be written using the cryptographic key, offset, or both. Further, in implementations, the SIEC 102 updates the memory address indicated in the DMA request based on the data stored in the control register. For example, the SIEC 102 updates the memory address indicated in the DMA request to indicate the memory address (e.g., GPA) indicated in the control register.

The SIEC 102 then provides the DMA request with the decrypted data to be written and updated memory address to IOMMU 116. In response to receiving the updated DMA request, IOMMU 116 is configured to translate the memory address indicated in the updated DMA request (e.g., GPA) that indicates a memory address 114 to an SPA that indicates the memory address 114. For example, IOMMU 116 is configured to translate the memory address indicated in the updated DMA request (e.g., GPA) to an SPA using a data structure (e.g., page table) that includes data mapping one or more GPAs to SPAs. After IOMMU 116 translates the memory address of the DMA request to SPA, IOMMU 116 provides the DMA with the translated SPA memory address to memory 108 (e.g., a memory controller of memory 108). In response to receiving the DMA request, memory 108 writes the decrypted data to be written indicated in the DMA request to the memory address 114 indicated in the translated SPA memory address. By using the SIEC 102 to handle DMA requests from the I/O device 104 before they are provided to memory 108, the SIEC 102 allows data stored on and provided by the I/O devices 104 to be encrypted while data written to memory 108 is unencrypted. As such, the risk that unencrypted data provided by the I/O devices 104 is exposed by, for example, bus interposers, is reduced as the data is encrypted when it is provided from the I/O devices 104 on the bus. Additionally, using an SIEC 102 to perform inline decryption of the data from the I/O devices to the memory obviates the need for system software to perform such decryption, increasing the processing efficiency of processing system 100.

If the DMA request received at the slot of the SIEC 102 indicates a read command, the SIEC 102 is configured to update the memory address indicated in the DMA request based on the data stored in the control register associated with the slot. For example, the SIEC 102 updates the memory address indicated in the DMA request to indicate the memory address (e.g., GPA) indicated in the control register. The SIEC 102 then provides the DMA request with the updated memory address to IOMMU 116. IOMMU 116 is configured to translate the memory address indicated in a received DMA request (e.g., GPA) to an SPA using the data structure (e.g., page table) that includes data mapping one or more GPAs to SPAs and provides the DMA with the translated SPA memory address to memory 108 (e.g., a memory controller of memory 108). After receiving the DMA request indicating a read command, memory 108 (e.g., a memory controller of memory 108), IOMMU 116, or both generate, based on the received DMA request, a completion packet including, for example, data indicating data to be written (e.g., the data read out from memory 108) to an I/O device 104 (e.g., the I/O device 104 that generated the DMA request), a memory address (e.g., MMIO memory address) of the I/O device, or both. For example, based on a received DMA request including data indicating a read request, an I/O device (e.g., a request ID of the I/O device), and a memory address (e.g., SPA) indicating a memory address 114 of memory 108, memory 108, IOMMU 116, or both generate a completion packet that includes data indicating data from the memory address 114 to be written to the I/O device 104 and a memory address (e.g., MMIO address) of a slot of the SIEC 102 (e.g., the slot that provided the updated DMA request to memory 108). Memory 108, IOMMU 116, or both then provide the completion packet to a slot of an SIEC 102 (e.g., the slot of an SIEC 102 that provided the DMA request to IOMMU 116 and prompted the completion packet). In response to receiving the completion packet at a slot, an SIEC 102 is configured to encrypt the data to be written indicated in the completion packet based on (e.g., using) one or more cryptographic keys, offsets, or both indicated by data stored in a control register associated with the slot. The SIEC 102 then provides the completion packet with the encrypted data to be written to the I/O device 104 indicated by the completion packet. In response to receiving a completion packet, an I/O device 104 writes the encrypted data indicated in the completion packet. In this way, the risk that unencrypted data provided to the I/O devices 104 is exposed by, for example, bus interposers, is reduced as the data is encrypted when it is provided to the I/O devices 104 on the bus.

Figure 2:
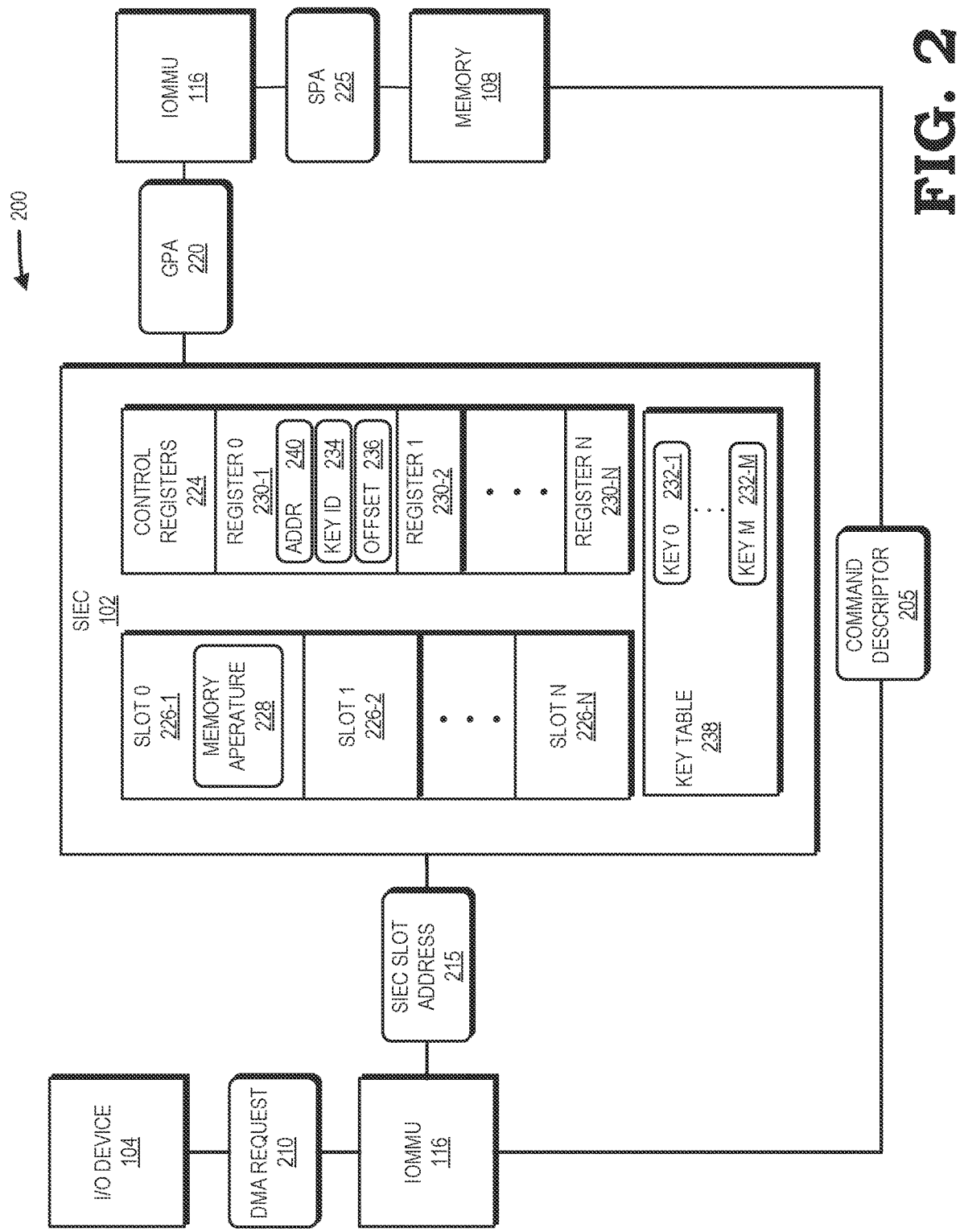
FIG. 2 is a block diagram of a framework for encrypting and decrypting data passing between an I/O device and a memory using an SIEC, in accordance with some implementations.

Referring now to FIG. 2, an example framework 200 for encrypting and decrypting data passing between an I/O device 104 and a memory 108 using an SIEC 102 is presented, in accordance with some implementations. In implementations, example framework 200 is implemented in processing system 100. Example framework 200 includes SIEC 102 which includes, for example, one or more slots 226. In implementations, each slot 226 of SIEC 102 is associated with a MMIO address 105 within the MMIO space 103 of system address space 110. To this end, system software (e.g., an operating system) executed by processor 118 is configured to program one or more base address registers (BARs) of SIEC 102 such that each slot of SIEC 102 has a respective MMIO address 105 within the MMIO space 103 of system address space 110. For example, in response to processing system 100 initializing, processor 118 is configured to program a BAR of SIEC 102 such that slot 0 226-1 has MMIO address 105-1 within MMIO space 103 of system address space 110. Each BAR of the SIEC 102 (not shown for clarity), for example, includes a register storing data indicating MMIO addresses 105 associated with the slots 226 of the SIEC 102. Additionally, each slot 226 of SIEC 102 is associated with a respective memory aperture 228 (e.g., window). Each memory aperture 228 is associated with one or more memory addresses 114 within memory 108 each representing a respective portion of memory 108 (e.g., 4 kb of memory 108). Each memory aperture 228 is associated with a respective memory address 114 such that an I/O device 104 is allowed to read and write data to and from the portion of memory 108 represented by the memory address 114. For example, using the slot 226-1 associated with a memory aperture 228, an I/O device 104 is configured to read and write data to and from, as an example, the memory addresses 114-1 indirectly by targeting the address of the memory aperture 228. Though the example implementation presented in FIG. 2 presents SIEC 102 as having three slots (226-1, 226-2, 226-N) representing an N number of slots 226, in other implementation SIEC 102 can include any number of slots 226.

Within example framework 200, an I/O device 104 is configured to retrieve command descriptor 205 from I/O command queue 112. Command descriptor 205 includes data indicating a command (e.g., read, write), a location within memory 108 (e.g., a memory address), data to be written, or any combination thereof. As an example, command descriptor 205 includes data indicating an I/O device 104, a memory address (e.g., IOVA, SPA) indicating a portion of memory 108, and a read command. As another example, command descriptor 205 includes data indicating an I/O device 104, a memory address (e.g., IOVA, SPA) indicating a portion of memory 108, a write command, and data to be written. To retrieve command descriptor 205, I/O device 104 first generates a DMA request including a memory address (e.g., IOVA) indicating a location of I/O command queue 112 and a read request and provides the DMA request to IOMMU 116. IOMMU 116 is configured to translate the memory address (e.g., IOVA) indicating the location in memory 108 in the DMA request to an SPA. For example, IOMMU 116 uses one or more page tables including data mapping one or more IOVAs to one or more respective SPAs to translate the memory address of the DMA request. After translating the memory address (e.g., IOVA) indicating the location in memory 108 in the DMA request to an SPA, IOMMU 116 provides the DMA request to memory 108. In implementations, because the memory address of the DMA request does not indicate a memory address, portion of memory 108, or both associated with any memory aperture 228 of a slot 226, the DMA request is provided directly from IOMMU 116 to memory 108, bypassing SIEC 102. In response to receiving the DMA request from IOMMU 116, memory 108 (e.g., a memory controller of memory 108) provides one or more command descriptors 205 from I/O command queue 112 to I/O device 104.

After receiving command descriptor 205, I/O device 104 is configured to generate DMA request 210. For example, in response to receiving command descriptor 205 from I/O command queue 112, the I/O device 104 generates DMA request 210 based on the received command descriptor 205. DMA request 210 includes, for example, data indicating, the I/O device 104 that generated the DMA request 210 (e.g., a requester ID), a memory command (e.g., read, write), a memory address (e.g., GPA) representing a portion of memory 108, data to be written to the memory, or any combination thereof. I/O device 104 then provides DMA request 210 to IOMMU 116 which is configured to translate the memory address (e.g., IOVA) indicated in DMA request 210 to a SIEC slot address 215 (e.g., memory address indicating a location of a slot 226 of SIEC 102). To this end, for example, IOMMU 116 uses one or more page tables including data mapping one or more IOVAs to slot memory addresses to translate the memory address (e.g., IOVA) indicated in DMA request 210 to a SIEC slot address 215 indicating a location of a slot 226 of SIEC 102. IOMMU 116 then provides DMA request 210 to the slot 226 of SIEC 102 indicated in the SIEC slot address 215.

In response to receiving DMA request 210 at a slot 226, SIEC 102 is configured to determine if DMA request 210 indicates a read command or a write command. When DMA request 210 indicates a write command, SIEC 102 is configured to decrypt the data to be written indicated in DMA request 210. To this end, SIEC 102 includes control registers 224 which include one or more registers 230 each associated with a respective slot 226. For example, in the example implementation of FIG. 2, register 0 230-1 is associated with slot 0 226-1, register 1 230-2 is associated with slot 1 226-2, and register N 230-N is associated with slot N 226-N. Each register 230, for example, includes data indicating a memory address (addr) 240, key identifier (key ID) 234, offset 236, or any combination thereof. Memory address 240 includes data indicating one or more memory addresses (e.g., GPAs) indicating the memory addresses, portion of system address space 110, or both associated with the memory aperture 228 of a respective slot 226 (e.g., the slot 226 associated with the register 230). Offset 236 includes data indicating one or more offsets (XTS offsets) to apply when encrypting or decrypting data. Key ID 234 includes data (e.g., a pointer) indicating a location of a cryptographic key. For example, Key ID 234 includes a pointer indicating a location within key table 238. Key table 238 includes, for example, a data structure (e.g., table) including one or more cryptographic keys 232. Such cryptographic keys 232 include, for example, AES keys, 3DES keys, IDEA keys, and the like. Though the example implementation presented in FIG. 2 shows key table 238 including two cryptographic keys (232-1, 232-M) representing an M number of cryptographic keys 232, in other implementations, key table 238 can include any number of cryptographic keys 232.

According to implementations, SIEC 102 is configured to decrypt data to be written indicated in DMA request 210 received at a slot 226, based on the key ID 234, offset 236, or both stored in a register 230 associated with the slot 226. For example, to decrypt the data to be written, SIEC 102 is first configured to determine the cryptographic key 232 at the location in key table 238 indicated by key ID 234. SIEC 102 then decrypts the data to be written indicated in DMA request 210 using the cryptographic key 232 (e.g., AES key) indicated by key ID 234, offset 236 (e.g., XTS offset), or both. Additionally, in implementations, SIEC 102 is configured to update the memory address indicated in DMA request 210 received at a slot 226 to a GPA 220 based on the memory address 240 stored in the register 230 associated with the slot 226. For example, SIEC 102 updates the memory address indicated in DMA request 210 to a GPA 220 matching the memory address 240 (e.g., GPA) stored in the register 230 associated with the slot 226 that received the DMA request. After decrypting the data to be written, updating the memory address, or both of DMA request 210, SIEC 102 provides DMA request 210 to IOMMU 116. IOMMU 116 is configured to translate the GPA 220 indicated in DMA request 210 to an SPA 225. For example, based on one or more page tables including data mapping one or more GPAs to respective SPAs, IOMMU 116 translates GPA 220 to SPA 225. IOMMU 116 then provides DMA request 210 indicating SPA 225 to memory 108. In response to receiving DMA request 210, memory 108 (e.g., a memory controller of memory 108) writes the decrypted data to be written indicated in DMA request 210 to the location of memory 108 indicated in the SPA 225 of the DMA request 210. In this way, SIEC 102 decrypts encrypted (e.g., ciphertext) provided from I/O device 104 before the data is stored in memory 108 as unencrypted data (e.g., cleartext).

When a DMA request 210 indicating a read command is received at a slot 226 of SIEC 102, SIEC 102 is configured to update the memory address indicated in DMA request 210 received at a slot 226 to a GPA 220 based on the memory address 240 stored in the register 230 associated with the slot 226. For example, SIEC 102 updates the memory address indicated in DMA request 210 to a GPA 220 matching the memory address 240 (e.g., GPA) stored in the register 230 associated with the slot 226 that received the DMA request. After updating the memory address of DMA request 210, SIEC 102 provides DMA request 210 to IOMMU 116. IOMMU 116 is configured to translate the GPA 220 indicated in DMA request 210 to an SPA 225. In response to receiving DMA request 210, memory 108 (e.g., a memory controller of memory 108), IOMMU 116, or both are configured to generate a completion packet indicating a slot 226 of SIEC 102 (e.g., a MMIO address 105 of the slot 226 that sent the DMA request) and unencrypted data to be written (e.g., data read out of the location of memory 108 indicated in SPA 225) and provide the completion packet to SIEC 102. For example, memory 108, IOMMU 116, or both provide the completion packet to the slot 226 of SIEC 102 that provided DMA request 210 to IOMMU 116, memory 108, or both (e.g., the slot 226 that received DMA request 210 from I/O device 104). In response to receiving the completion packet at a slot, the SIEC 102 is configured to encrypt the data to be written indicated in the completion packet. For example, SIEC 102 is configured to encrypt the data to be written indicated in the completion packet based on the key ID 234, offset 236, or both indicated by the register 230 associated with the slot 226 that received the completion packet. As an example, SIEC 102 is configured to determine the cryptographic key 232 in key table 238 indicated by key ID 234. SIEC 102 then encrypts the data to be written indicated in the completion packet using the cryptographic key 232, offset 236, or both. After encrypting the data to be written indicated in the completion packet, the SIEC 102 provides the completion packet to I/O device 104 (e.g., the I/O device 104 that provided DMA request 210 to the SIEC 102). I/O device 104 then stores the encrypted data to be written indicated in the completion packet. As such, the SIEC 102 also encrypts unencrypted data (e.g., cleartext) provided from memory 108 before the data is stored in I/O device 104 as encrypted data (e.g., ciphertext).

Figure 3:
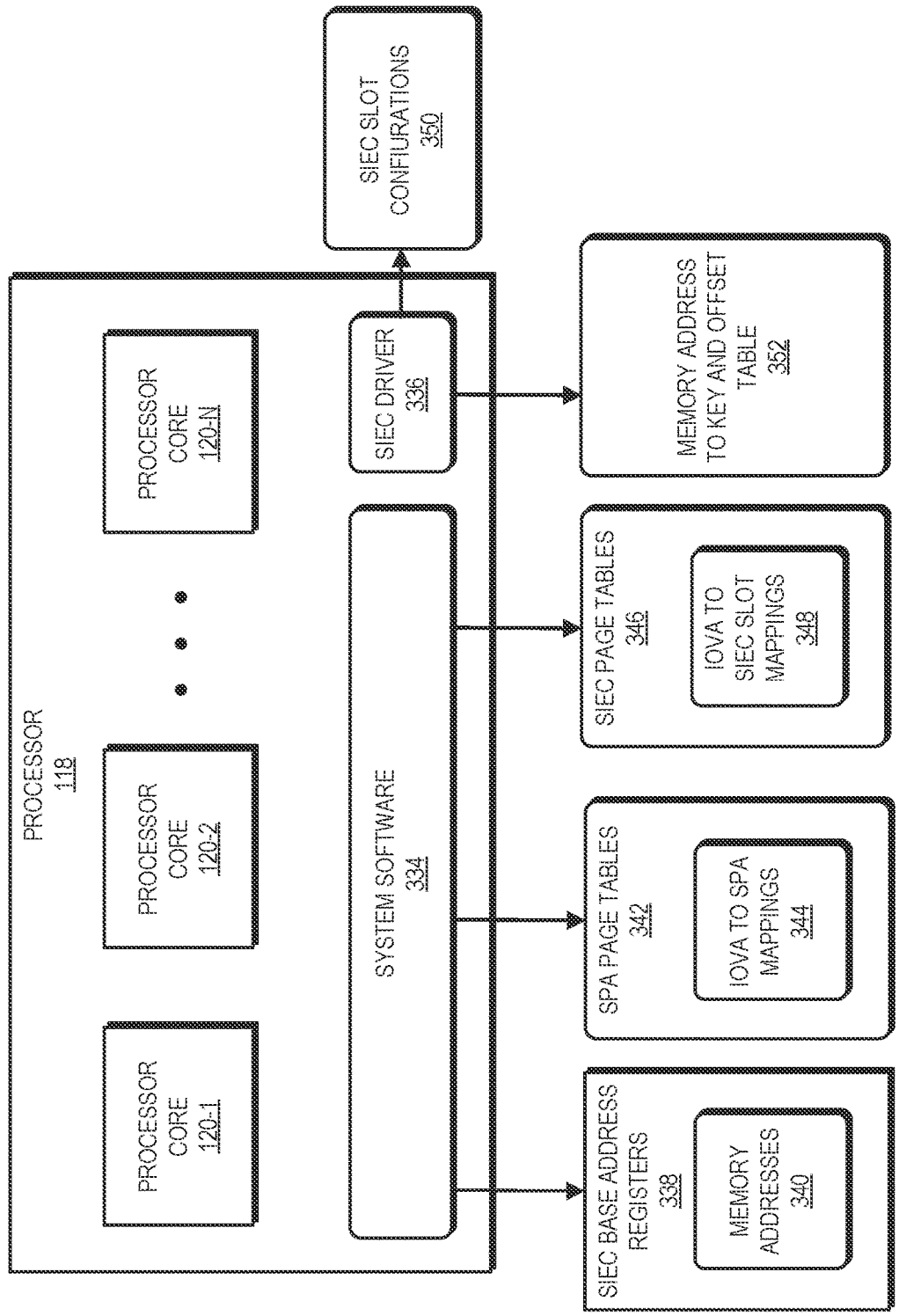
FIG. 3 is a block diagram of a framework for initializing a processing system including one or more SIECs, in accordance with some implementations.

Referring now to FIG. 3, a framework 300 for initializing processing system 100 including one or more SIECs 102 is presented, in accordance with some implementations. In some implementations, framework 300 is implemented in processing system 100. Within framework 300, processor 118 is configured to execute one or more instructions for an application executed by, for example, a VM. To this end, processor 118 includes one or more processor cores 120 each configured to perform one or more operations for one or more applications. For example, one or more processor cores 120 function as a compute unit that includes one or more SIMD units configured to concurrently perform one or more operations for one or more instructions of an application. Though the example implementation presented in FIG. 3 presents processor 118 as having three processor cores (120-1, 120-2, 120-N) representing an N number of processor cores 120, in other implementations, processor 118 can include any number of processor cores 120. In implementations, processor 118 is configured to execute instructions for system software 334. System software 334 includes, for example, program code configured to manage (e.g., allocate, configure) resources (e.g., memory resources) of processing system 100. As an example, system software 334 includes, for example, an operating system configured to manage memory resources of processing system 100 by issuing one or more instructions to be executed (e.g., by processor 118).

According to implementations, system software 334 is configured to program SIEC base address registers (BARs) 338 such that each slot 226 of an SIEC 102 in processing system 100 is associated with a MIMO address 105 within the MMIO space 103 of system address space 110. SIEC BARs 338 include, for example, registers storing data indicating MMIO addresses 105 associated with the slots 226 of an SIEC 102. To program SIEC BARs 338, system software 334 is configured to store data indicating one or more memory addresses 340 (e.g., MIMO addresses 105 within the MMIO space 103 of system address space 110) in one or more SIEC BARs 338. For example, system software 334 is configured to store data indicating a base address (e.g., first address) of one or more memory addresses 340 in one or more SIEC BARs 338. By storing the data indicating one or more memory addresses 340 in one or more SIEC BARs 338, one or more slots 226 of SIEC 102 are each associated with a respective memory address 340 (e.g., MMIO address) within system address space 110. Further, in implementations, system software 334 is configured to generate SPA page tables 342. Such SPA page tables 342 include, for example, page tables that store data including one or more IVOA to SPA mappings 344. That is to say, data mapping one or more IOVAs indicating a portion of memory 108 to a respective SPA. In implementations, such SPA page tables 342 are used by IOMMU 116 to translate an IOVA indicated in a DMA request (e.g., DMA request 210) to an SPA. According to implementations, system software 334 is configured to generate SIEC page tables 346. SIEC page tables 346 include, for example, one or more page tables that store data indicating one or more IOVA to SIEC slot mappings. That is to say, data mapping one or more IOVAs to the MMIO address 105 of respective slots 226 of one or more SIECs 102. Such SIEC page tables 346 are used by, for example, IOMMU 116 to translate an IOVA indicated in a DMA request (e.g., DMA request 210) received from an I/O device 104 to the MMIO address 105 of a slot 226 of an SIEC 102.

Further, within framework 300, processor 118 is configured to execute instructions for SIEC driver 336. SIEC driver 336 includes, for example, program code configured to manage one or more slots 226 of an SIEC 102 by managing SIEC slot configurations 350. For example, SIEC driver 336 issues one or more instructions to processor 118 that, when executed, manage SIEC slot configurations 350. SIEC slot configurations 350 include, for example, the data (e.g., memory address 240, key ID 234, offset 236) stored in the registers 230 (e.g., control registers 224) of an SIEC 102 that are each associated with a respective slot 226 of the SIEC 102. Additionally, in implementations, to manage one or more slots 226 of an SIEC 102, SIEC driver 336 (e.g., via an agent) is configured to maintain memory address to key and offset table 352. Memory address to key and offset table 352 includes, for example, a data structure storing data that associates one or more memory addresses (e.g., GPAs) within system address space 110 to one or more cryptographic keys 232 stored in a key table 238, offsets 236, or both. That is to say, memory address to key and offset table 352 indicates the cryptographic key 232, offset 236, or both to be used when encrypting or decrypting data associated with a respective memory address within system address space 110. As an example, memory address to key and offset table 352 includes data (e.g., an index) indicating a cryptographic key 232 stored on the SIEC 102, an offset 236, or both to be used when encrypting or decrypting data associated with a respective memory address within system address space 110. According to implementations, SIEC driver 336 maintains memory address to key and offset table 352 based on data provided by one or more agents (e.g., cryptographic agents) within processing system 100. As an example, SIEC driver 336 maintains memory address to key and offset table 352 based on data provided from an agent indicating cryptographic keys 232 and offsets 236 to be used when encrypting and decrypting data associated with one or more storage volumes (e.g., disks).

To manage a slot 226 of an SIEC 102, SIEC driver 336 is configured first update one or more SIEC slot configurations 350 (e.g., data stored in the register 230 associated with the slot) based on one or more command descriptors 205 stored in I/O command queue 112. For example, in response to a command descriptor 205 stored in I/O command queue 112 indicating a first memory address (e.g., GPA), SIEC driver 336 updates an SIEC slot configuration 350 based on the indicated first memory address. To this end, SIEC driver 336 updates an SIEC slot configuration 350 by storing data (e.g., memory address 240) indicating the first memory address (e.g., GPA) in a register 230 associated with the slot 226. By storing data indicating the first memory address (e.g., GPA) in a register 230 associated with the slot 226, the slot 226 is configured to provide a memory aperture 228 to the portion of memory 108 associated with the first memory address for one or more I/O devices 104. Further, SIEC drivers 336 updates an SIEC slot configuration 350 by storing, in a register 230, data (e.g., key ID 234, offset 236) indicating a cryptographic key 232, offset 236, or both to be used when encrypting and decrypting data received by the slot 226. For example, based on memory address to key and offset table 352, SIEC driver 336 determines a cryptographic key 232, offset 236, or both associated with the memory address (e.g., GPA) of a command descriptor 205 stored in I/O command queue 112, the memory address (e.g., memory address 240) programmed into a register 230, or both. After determining a cryptographic key 232, offset 236, or both, SIEC driver 336 updates an SIEC slot configuration 350 of a slot 226 by storing data (e.g., key ID 234) indicating the cryptographic key 232 in a register 230 associated with the slot 226, storing data indicating the offset 236 in the register 230 associated with the slot 226, or both.

According to some implementations, SIEC driver 336 is configured to create initial SIEC slot configurations 350 associated with one or more command descriptors 205 in I/O command queue 112. Additionally, in some implementations, in response to a DMA request (e.g., DMA request 210) associated with a command descriptor 205 (e.g., the DMA request generated from the command descriptor 205) being completed, SIEC driver 336 is configured to reset or reconfigure (e.g., delete or update data from a register 230) an SIEC slot configuration 350 for the slot 226 associated with the DMA request (e.g., the slot 226 that handled the DMA request). For example, in response to a DMA request associated with a command descriptor 205 being completed, SIEC driver 336 is configured to reconfigure (e.g., a processor 108 is configured to configure) the SIEC slot configuration 350 of the slot 226 associated with the DMA request based on another command descriptor 205 (e.g., a second command descriptor 205) stored in I/O command queue 112. In this way, SIEC driver 336 reconfigures one or more slots 226 to handle DMA requests based on command descriptors 205 that are subsequently added to I/O command queue 112.

Figure 4:
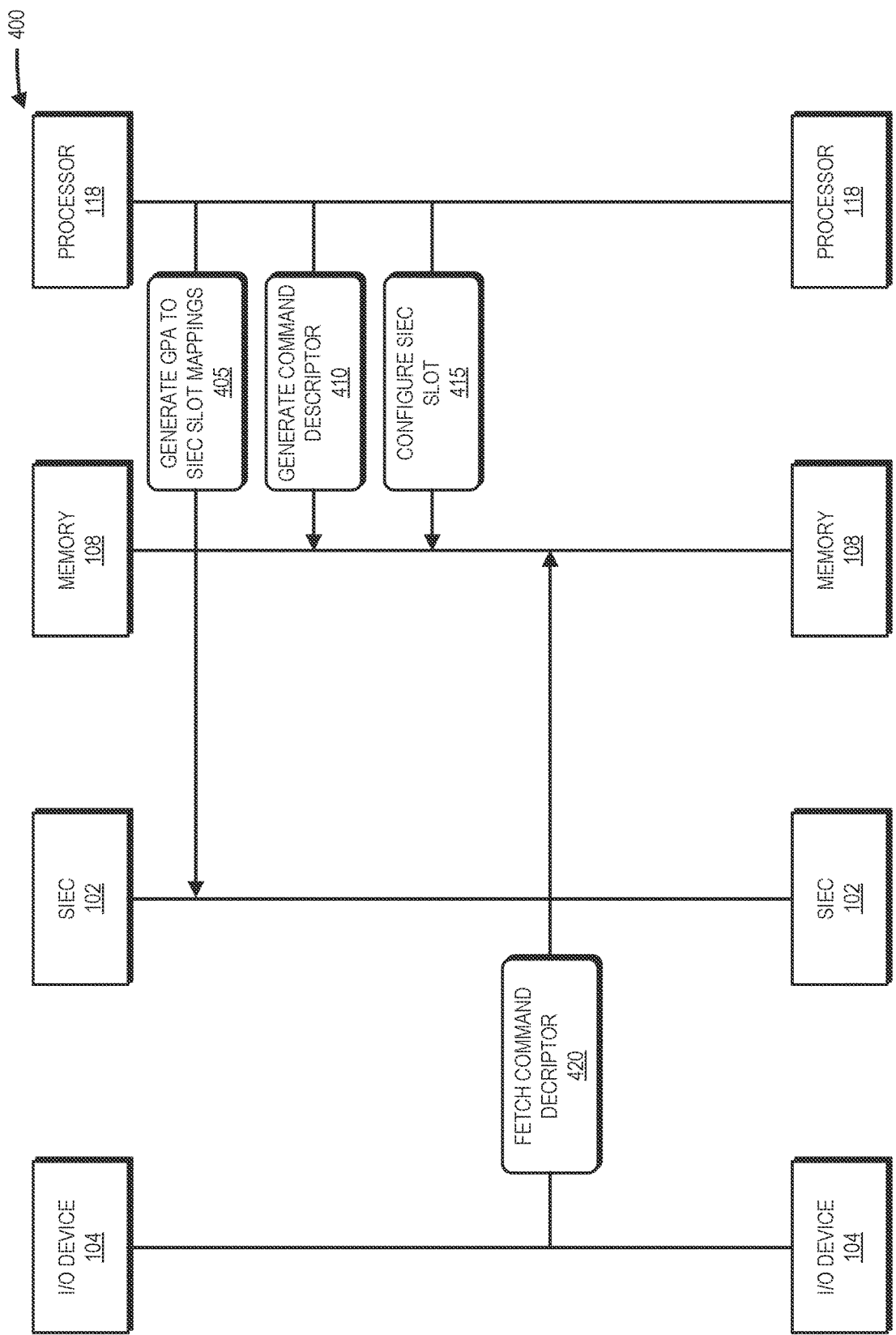
FIG. 4 is a signal flow diagram of an example operation for handling a direct memory access request at a slot of an SIEC, in accordance with some implementations.

Referring now to FIG. 4, an example operation 400 for handling a DMA request (e.g., DMA request 210) at a slot 226 of an SIEC 102 is presented, in accordance with some implementations. In implementations, example operation 400 includes processor 118 performing a generate IOVA to SIEC slot mappings 405 operation. The generate IOVA to SIEC slot mappings 405 operation includes processor 118 executing one or more instructions from system software 334 to generate SIEC page tables 346 that includes data (e.g., IOVA to SIEC slot mappings 348) mapping one or more IOVAs representing a location in memory 108 to a respective slot 226 of an SIEC 102. That is to say, for example, system software 334 issues one or more instructions to processor 118 that, when executed, generate SIEC page tables 346 that include data mapping IOVAs representing respective portions (e.g., 4 kb portions) of memory 108 to respective slots 226 of SIECs 102. In response to generating SIEC page tables 346, processor 118 stores SIEC page tables 346 in memory 108. Further, example operation 400 includes processor 118 performing a generate command descriptor operation 410. Generate command descriptor operation 410 includes processor 118 receiving one or more instructions from an application executed by processing system 100, a VM, or both. When such instructions from the application are executed, processor 118 generates a command descriptor (e.g., command descriptor 205) that includes data indicating a command (e.g., read, write), a location within memory 108 (e.g., a memory address, IOVA), data to be written, or any combination thereof. After generating the command descriptor, processor 118 stores the command descriptor in I/O command queue 112.

According to implementations, example operation 400 includes processor 118 performing a configure SIEC slot operation 415. The configure SIEC slot operation 415 includes processor 118 configuring a slot 226 of an SIEC 102 by storing data in a register 230 associated with the slot 226 associated with a command descriptor stored in I/O command queue 112. For example, processor 118 is configured to receive one or more instructions from SIEC driver 336 that, when executed, store data in a control register 224 associated with a slot 226 based on a command descriptor stored in I/O command queue 112. As an example, based on a command descriptor including a memory address (e.g., IOVA) indicating a location in memory 108, SIEC driver 336 issues one or more instructions that, when executed, update a memory address (e.g., memory address 240) in a register 230 to match the memory address (e.g., IOVA) indicated in a command descriptor stored in I/O command queue 112. Additionally, processor 118 is configured to determine a cryptographic key 232, offset 236, or both based on the memory address of the command descriptor. For example, using memory address to key and offset table 352, processor 118 determines a cryptographic key 232, offset 236, or both associated with the memory address of the command descriptor. After determining the cryptographic key 232, offset 236, or both, processor 118 then updates a register 230 (e.g., the register 230 indicating the memory address of the command descriptor) to store data (e.g., key ID 234) indicating the determined cryptographic key 232, data indicating the determined offset 236, or both.

Additionally, example operation 400 includes an I/O device 104 performing a fetch command descriptor operation 420. Such a fetch command descriptor operation 420 includes the I/O device generating a DMA request indicating a read request and a memory address (e.g., IOVA) indicating the I/O command queue 112. An IOMMU (e.g., IOMMU 116) then translates the memory address of the DMA request to an SPA and provides the DMA request to memory 108. Because the DMA request indicates a memory address (e.g., IOVA) indicating the I/O command queue 112 rather than a location of memory 108 associated with one or more slots 226 (e.g., memory apertures 228), the IOMMU provides the DMA request directly to memory 108, bypassing the SIECs 102. In response to receiving the DMA request, memory 108 provides one or more command descriptors (e.g., command descriptor 205) to the I/O device 104. After receiving the command descriptor, I/O device 104 then generates a DMA request indicating the command (e.g., read, write), I/O device 104 (e.g., an requestor ID), location within memory 108 (e.g., a memory address, IOVA), data to be written, or any combination thereof indicated by the command descriptor received from I/O command queue 112. The I/O device 104 then provides the DMA request to an IOMMU (e.g., IOMMU 116) included in or otherwise coupled to the I/O device 104. After receiving the DMA request, the IOMMU is configured to access SIEC page tables 346 that include data mapping one or more memory addresses (e.g., IOVAs) to respective memory address of slots 226 of one or more SIECs 102. After accessing SIEC page tables 346, the IOMMU translates the memory address (e.g., IOVA) in the DMA request to the memory address of a slot 226 based on the data (e.g., IOVA to SIEC slot mappings 348) stored in SIEC page tables 346. After translating the memory address to a memory address of a slot 226, the IOMMU provides the DMA request to the slot 226 indicated in the translated memory address.

Figure 5:
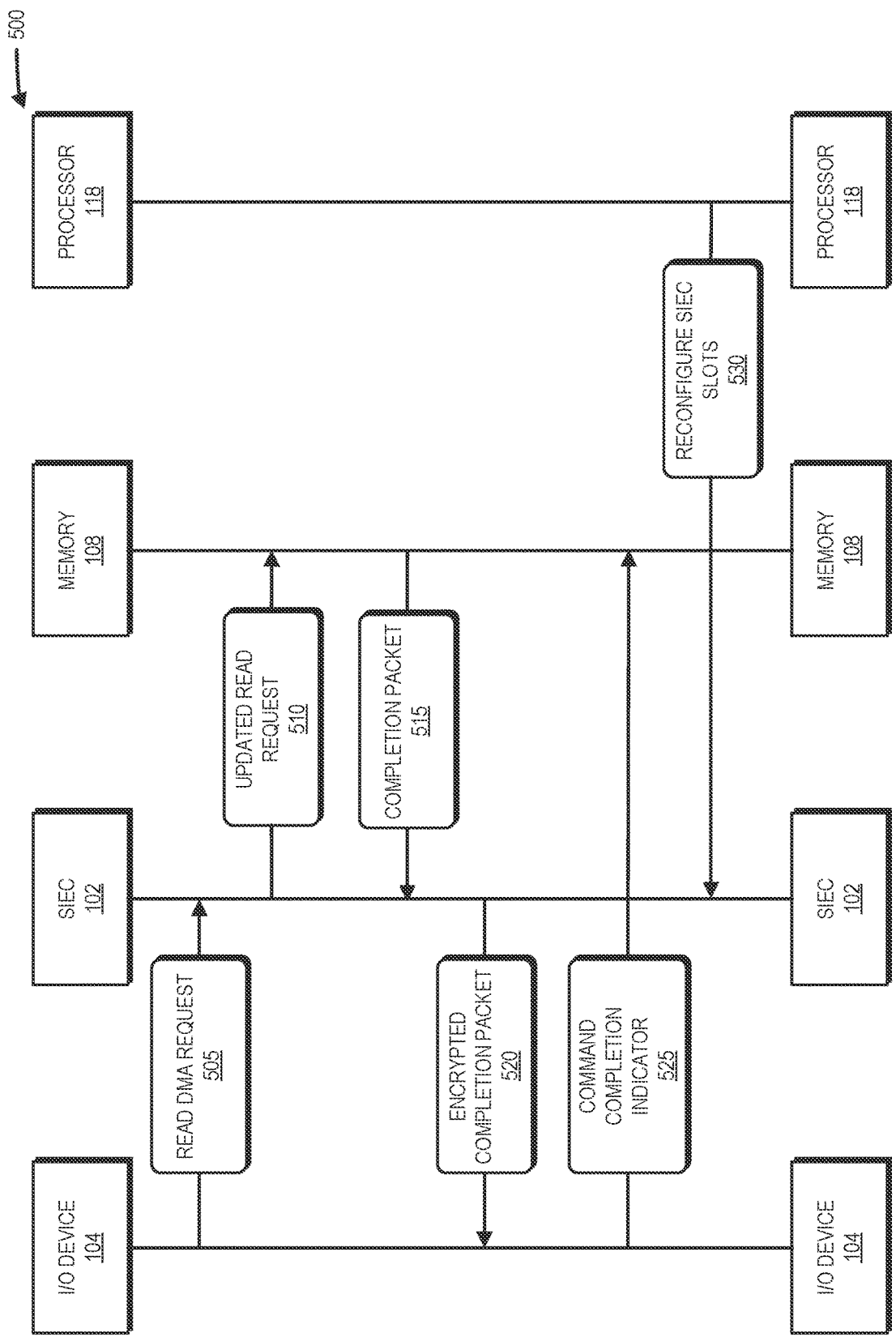
FIG. 5 is a signal flow diagram of an example operation for handling a read direct memory access request at an SIEC, in accordance with some implementations.

Referring now to FIG. 5, an example operation 500 for an SIEC 102 handling a read DMA request is presented, in accordance with some implementations. In implementations, for example, example operation 500 is performed after example operation 400 presented in FIG. 4. In implementations, example operation 500 includes SIEC 102 receiving a DMA request indicating a read request (e.g., read DMA request 505) at a slot 226. In response to receiving read DMA request 505, SIEC 102 is configured to update the memory address indicated in read DMA request 505 based on data stored in a register 230 associated with the slot 226 on which read DMA request 505 was received. For example, SIEC 102 updates the memory address indicated in read DMA request 505 to match the memory address 240 (e.g., GPA) indicating a location within memory 108 stored in the register 230 associated with the slot 226 on which read DMA request 505 was received. After updating read DMA request 505 with the memory address to produce updated read request 510, SIEC 102 provides the updated read request 510 to memory 108. For example, SIEC 102 first provides updated read request 510 to an IOMMU (e.g., IOMMU 116) configured to translate the updated memory address (e.g., GPA) of updated read request 510 to an SPA indicating a location (e.g., memory address 114) of memory 108. After the memory address is translated, the IOMMU provides the updated read request 510 to memory 108.

In response to receiving updated read request 510, memory 108 generates completion packet 515 based on updated read request 510. Completion packet 515, for example, includes data indicating the slot of 226 of SIEC 102 that provided updated read request 510, data to be written to the I/O device 104 (e.g., the data read of the location of memory 108 indicated in the memory address of updated read request 510), or both. Memory 108 then provides completion packet 515 to a slot 226 of SIEC 102. For example, memory 108 provides completion packet 515 to the slot 226 of SIEC 102 that provided updated read request 510 to memory 108. After receiving completion packet 515 at a slot 226, SIEC 102 encrypts the data to be written indicated in completion packet 515 based on data stored in the register 230 associated with the slot 226 to produce encrypted completion packet 520. As an example, SIEC 102 encrypts the data to be written indicated in completion packet 515 using the cryptographic key 232, offset 236, algorithm strength, mode specification, or any combination thereof indicated by the register 230 associated with the slot 226 on which completion packet 515 was received to produce encrypted completion packet 520. SIEC 102 then provides encrypted completion packet 520 to the I/O device 104 (e.g., the I/O device 104 indicated in encrypted completion packet 520).

Once I/O device 104 receives encrypted completion packet 520, I/O writes the encrypted data to be written indicated in encrypted completion packet 520 to the I/O device 104, relays the encrypted data to be written to an agent of the processing system 100, or both. Additionally, in response to receiving encrypted completion packet 520, I/O device generates command completion indicator 525 which includes data indicating that read DMA request 505 was completed and provides command completion indicator 525 to memory 108. After receiving command completion indicator 525, memory 108 updates a completion queue (e.g., circular queue) in memory 108 that includes data indicating how many command descriptors from I/O command queue 112 have been performed. Additionally, in some implementations, after memory 108 receives command completion indicator 525, processor 118 performs reconfigure SIEC slots operation 530. Reconfigure SIEC slots operation 530 includes processor 118 reconfiguring one or more slots 226 of SIEC 102 based on one or more remaining command descriptors in I/O command queue 112 by, for example, updating the data stored in one or more registers 230 associated with the slots 226. In this way, processor 118 reconfigures slots 226 of SIEC 102 as command descriptors in I/O command queue 112 are completed, allowing processor 118 to configure the slots 226 to handle new command descriptors that are added to I/O command queue 112.

Figure 6:
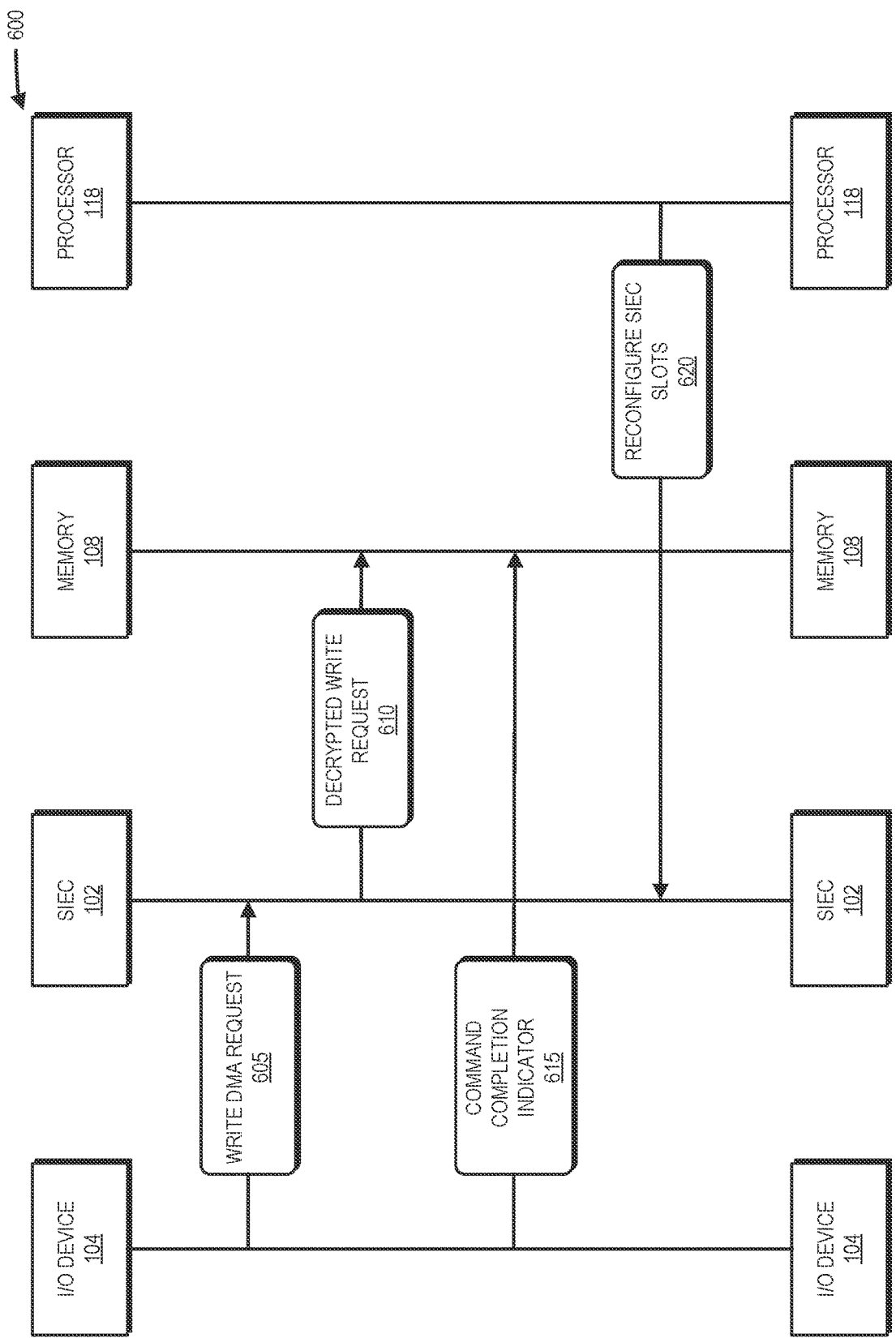
FIG. 6 is a signal flow diagram of an example operation for handling a write direct memory access request at an SIEC, in accordance with some implementations.

Referring now to FIG. 6, an example operation 600 for an SIEC 102 handling a write DMA request is presented, in accordance with some implementations. In implementations, for example, example operation 600 is performed after example operation 400 presented in FIG. 4. According to implementations, example operation 600 includes SIEC 102 receiving a DMA request indicating a write request (e.g., write DMA request 605) at a slot 226 that includes encrypted data to be written to a location within memory 108. After receiving write DMA request 605, SIEC 102 is configured to decrypt the data to be written indicated in write DMA request 605 to produce decrypted write request 610. For example, SIEC is configured to decrypt the data to be written based on a control register 224 associated with the slot 226 on which write DMA request 605 was received to produce decrypted write request 610. As an example, in response to receiving write DMA request 605 at a slot 226, SIEC 102 decrypts the data to be written indicated in write DMA request 605 using a cryptographic key 232, offset 236, or both indicated by the data stored in the register 230 associated with the slot 226. Additionally, SIEC 102 is configured to update the memory address indicated in write DMA request 605 based on data stored in a register 230 to produce decrypted write request 610. For example, SIEC 102 updates the memory address indicated in write DMA request 605 to match the memory address 240 (e.g., GPA) indicating a location within memory 108 stored in the register 230 associated with the slot 226 on which write DMA request 605 was received. In implementations, SIEC 102 provides decrypted write request 610 to memory 108. For example, SIEC 102 first provides decrypted write request 610 to an IOMMU (e.g., IOMMU 116) configured to translate the updated memory address (e.g., GPA) of decrypted write request 610 to an SPA indicating a location (e.g., memory address 114) of memory 108. After the memory address is translated, the IOMMU the provides decrypted write request 610 to memory 108. In response to receiving decrypted write request 610, memory 108 write the decrypted data to be written to a location in memory 108 indicated by the memory address (e.g., translated memory address) of decrypted write request 610.

In implementations, I/O device 104 is configured to generate a command completion indicator 615 which includes data indicating that write DMA request 605 was completed and to provide command completion indicator 615 to memory 108. For example, in some implementations, I/O device 104 generates command completion indicator 615 and provides command completion indicator 615 to memory 108 concurrently with providing write DMA request 605 to SIEC 102. After receiving command completion indicator 615, memory 108 updates a completion queue (e.g., circular queue) in memory 108 that includes data indicating how many command descriptors from I/O command queue 112 have been performed. Additionally, in some implementations, after memory 108 receives command completion indicator 615, processor 118 performs reconfigure SIEC slots operation 620. Reconfigure SIEC slots operation 620 includes processor 118 reconfiguring one or more slots 226 of SIEC 102 based on one or more remaining command descriptors in I/O command queue 112 by, for example, updating the data stored in one or more registers 230 associated with the slots 226.

Figure 7:
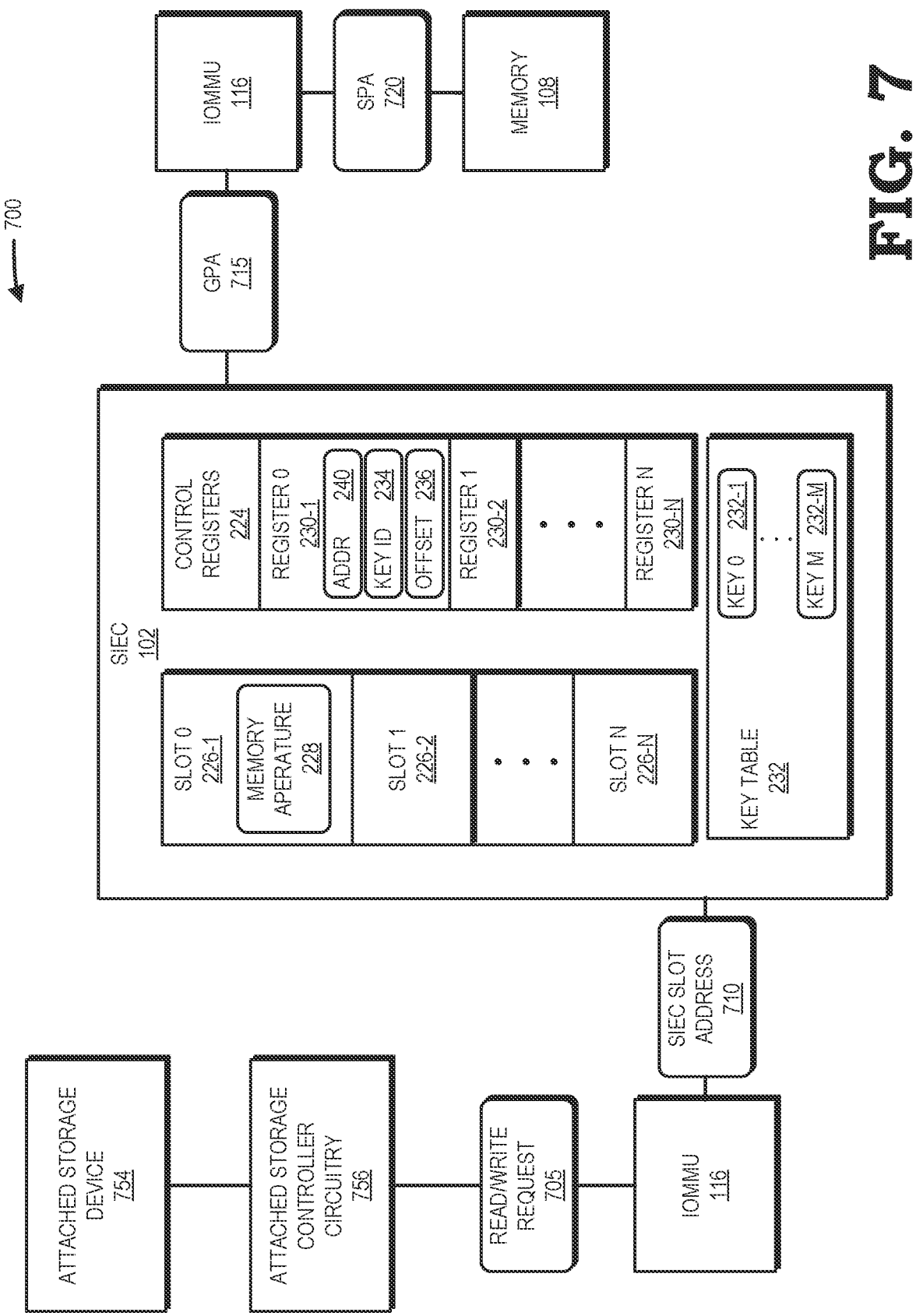
FIG. 7 is a block diagram of a framework for managing direct memory access requests from one or more attached storage devices at an SIEC, in accordance with some implementations.

Referring now to FIG. 7, a framework 700 for managing DMA requests from one or more attached storage devices is presented, in accordance with some implementations. In implementations, framework 700 is implemented in processing system 100. Framework 700 includes an attached storage device 754 connected to an attached storage controller circuitry. Such an attached storage device 754 includes, for example, a network-attached storage device, universal serial bus (USB) memory device (e.g., flash drive), or both. Further, such an attached storage controller circuitry 756 includes hardware-based circuitry, software-based circuitry, or both configured to manage (e.g., read and write) data with attached storage device 754. According to implementations, attached storage controller circuitry 756 is controlled, for example, by system software 334. That is to say, system software 334 is configured to issue one or more instructions to processor 118 that, when executed, cause attached storage controller circuitry 756 to perform one or more actions (e.g., read data, write data, generate read requests, generate write requests). For example, based on system software 334, attached storage controller circuitry 756 is configured to generate one or more read/write requests 705 (e.g., memory requests). These read/write requests 705 include, for example, data indicating the attached storage device 754 (e.g., a requestor ID), a read command, a write command, data to be written, a location (e.g., memory address) within memory 108, or any combination thereof. For example, a read/write request includes data indicating a write command, data to be written, and a memory address (e.g., GPA) of memory 108. As another example, a read/write request 705 includes data indicating a read command and a memory address (e.g., GPA) of memory 108.

According to implementations, data stored in attached storage device 754 is encrypted while the data stored in memory 108 is unencrypted. To this end, attached storage controller circuitry 756 is configured to provide a read/write request 705 (e.g., memory request) to IOMMU 116 which is configured to translate a memory address indicated in the read/write request 705 to a memory address indicating a slot 226 of SIEC 102 (e.g., SIEC slot address 710). For example, using SPA page tables 342, IOMMU 116 is configured to translate a memory address (e.g., GPA) indicated in a read/write request 705 to a memory address indicating a slot 226 of SIEC 102. After translating the memory address to indicate a slot 226 of SIEC 102 (e.g., SIEC slot address 710), IOMMU 116 provides the read/write request 705 to the slot 226 indicated by the translated memory address (e.g., SIEC slot address 710). The SIEC 102 then determines whether the received read/write request 705 indicates a read command or a write command. If the received read/write request 705 indicates a read command, the SIEC 102 updates the memory address indicated in the read/write request 705 based on a register 230 associated with the slot 226 on which the read/write request was received. For example, the SIEC 102 updates the memory address indicated in the read/write request 705 to match the memory address (e.g., memory address 240) indicated by the register 230 associated with the slot 226. The SIEC 102 then provides the read/write request 705 with the updated memory address (e.g., GPA 715) to IOMMU 116 which translates the updated memory address (e.g., GPA 715) to SPA 720. IOMMU 116 then provides read/write request 705 memory 108.

In response to receiving read/write request 705, memory 108 generates a completion packet indicating the attached storage device 754 (e.g., a memory address) and data to be written (e.g., data read of out the location of memory 108 indicated by SPA 720) and provides the completion packet to SIEC 102. For example, memory 108 provides the completion packet to the slot 226 of SIEC 102 that provided read/write request 705 to memory 108. SIEC 102 then encrypts the data to be written indicated in the completion packet using a cryptographic key 232, offset 236, or both indicated by the register 230 associated with the slot 226 that received the completion packet. Next, SIEC 102 provides the encrypted completion packet to attached storage controller circuitry 756, attached storage device 754, or both.

If the received read/write request 705 indicates a write command and encrypted data to be written, the SIEC 102 is configured to decrypt the encrypted data to be written based on a register 230 associated with slot 226 on which the read/write request 705 was received. For example, the SIEC 102 decrypts the encrypted data to be written using a cryptographic key 232, offset 236, or both indicated by the register 230 associated with the slot 226 that received the read/write request 705. Additionally, SIEC 102 updates the memory address indicated in the read/write request 705 based on the register 230 associated with the slot 226 on which the read/write request was received. For example, the SIEC 102 updates the memory address indicated in the read/write request 705 to match the memory address (e.g., memory address 240) indicated by the register 230 associated with the slot 226. The SIEC 102 then provides the read/write request 705 with the decrypted data to be written and updated memory address (e.g., GPA 715) to IOMMU 116 which translates the updated memory address (e.g., GPA 715) to SPA 720. IOMMU 116 then provides read/write request 705 memory 108. In response to receiving read/write request 705, memory 108 writes the decrypted data to a location of memory 108 indicated by SPA 720. In this way, the SIEC 102 allows data stored in attached storage device 754 to be encrypted while data stored in memory 108 is unencrypted. Additionally, because data is encrypted when it is provided to and from attached storage device 754 the risk that bus interposed snoop unencrypted data provided to and from attached storage device 754 is reduced, increasing the security of processing system 100.

Figure 8:
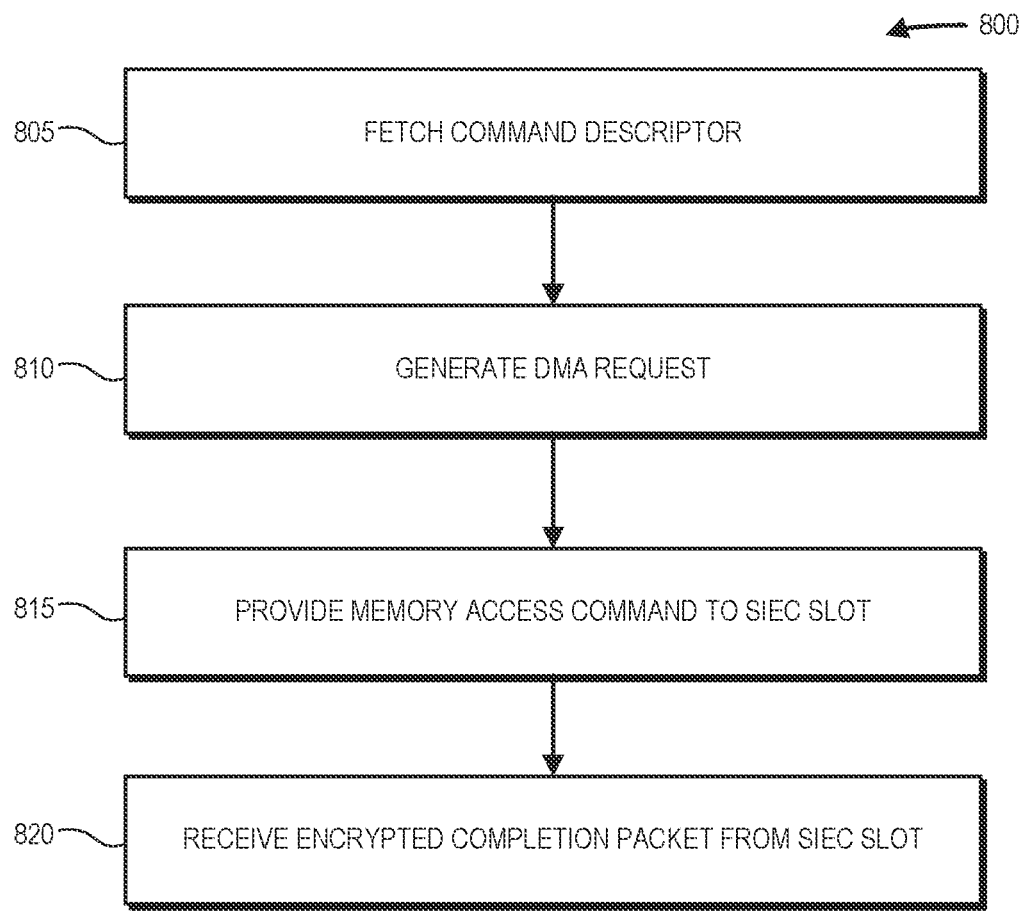
FIG. 8 is a flow diagram of an example method for an I/O device using an SIEC to handle direct memory access requests, in accordance with some implementations.

Referring now to FIG. 8, an example method 800 for an I/O device using an SIEC 102 to handle DMA requests is presented, in accordance with some implementations. At step 805 of example method 800, an I/O device 104 retrieves a command descriptor 205 from I/O command queue 112. For example, I/O device 104 generates a DMA request indicating a read request and a memory address of the I/O device and provides the DMA request (e.g., via an IOMMU) to memory 108. In response, memory 108 reads out a command descriptor from I/O command queue 112 and provides the command descriptor to the I/O device 104. The command descriptor 205 includes, for example, data indicating a command (e.g., read, write), a location within memory 108 (e.g., a memory address), data to be written, or any combination thereof. At step 810, the I/O device 104 generates a DMA request (e.g., DMA request 210) based on the received command descriptor 205. For example, the I/O device generates a DMA request indicating the command (e.g., read, write), location within memory 108 (e.g., a memory address, IOVA), data to be written, or any combination thereof indicated in the received command descriptor 205. Further, at step 810 an IOMMU (e.g., IOMMU 116) connected to the I/O device 104 determines a slot 226 of an SIEC 102 for the DMA request. To this end, the IOMMU is configured to translate a memory address (e.g., IOVA) indicated in the DMA request to a memory address (e.g., MMIO address 105) of a slot 226 of an SIEC using, for example, SIEC page tables 346 that include, for example, data mapping one or more IOVAs to respective memory addresses of slots 226 of SIECs 102. At step 815, after the IOMMU has translated the memory address indicated in the DMA request to a memory address of a slot 226 of an SIEC 102, the IOMMU provides the DMA request to the slot 226 indicated by the memory address.

Still referring to step 815, in response to receiving the DMA request at a slot, the SIEC 102 is configured to decrypt any data to be written indicated in the DMA request and update the memory address indicated in the memory address based on a control register associated with the slot. For example, the SIEC 102 decrypts data to be written indicated in the DMA request based on a cryptographic key 232, offset 236, or both indicated by the register 230 associated with the slot 226 that received the DMA request. As another example, the SIEC updates the memory address of the DMA request to match the memory address indicated by the register 230 associated with the slot 226 that received the DMA request. The SIEC 102 then provides the updated DMA request to memory 108. At step 820, in response to the DMA request provided to the SIEC 102 indicating a read request, the SIEC 102 is configured to receive a completion packet 515 after providing the updated DMA request to memory 108. For example, SIEC 102 is configured to receive a completion packet 515 indicating data to be written at a slot 226 of the SIEC 102. In response to receiving a completion packet 515 at a slot 226, the SIEC 102 is configured to encrypt the data to be written indicated in the completion packet 515 based on a control register 224 associated with the slot to produce an encrypted completion packet. For example, the SIEC 102 encrypts the data to be written using a cryptographic key 232, offset 236, or both indicated in a register 230 associated with the slot 226 that received the completion packet 515. Still referring to step 820, after the SIEC 102 encrypts the data to be written indicated in the completion packet to produce an encrypted completion packet, the I/O device 104 receives the encrypted completion packet from the SIEC 102 and stores the encrypted data to be written on the I/O device 104.

In some implementations, the apparatus and techniques described above are implemented in a system including one or more integrated circuit (IC) devices (also referred to as integrated circuit packages or microchips), such as the SIEC described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A processing system comprising:
 a memory;
 a storage inline encryption circuit (SIEC) connected to the memory, the SIEC including a plurality of slots each associated with a corresponding memory address of the memory and the SIEC configured to:
  provide a direct memory access (DMA) request received at a first slot of the plurality of slots to the memory based on the corresponding memory address associated with the first slot; and
  in response to receiving a completion packet from the memory at the first slot, encrypting data associated with the completion packet based on the first slot.

2. The processing system of claim 1, wherein each slot of the plurality of slots is associated with a corresponding cryptographic key and wherein the SIEC is configured to encrypt the data associated with the completion packet based on the cryptographic key associated with the first slot.

3. The processing system of claim 2, wherein the SIEC includes a key table including a plurality of cryptographic keys.

4. The processing system of claim 1, wherein the memory includes a command queue storing a command descriptor.

5. The processing system of claim 4, further comprising a processor configured to configure the first slot of the SIEC based on the command descriptor.

6. The processing system of claim 5, wherein the processor is configured to reconfigure the first slot of the SIEC based on a second command descriptor in the command queue in response to a completion indicator being received by the memory.

7. The processing system of claim 1, wherein the SIEC is configured to encrypt the data associated with the completion packet based on an offset associated with the first slot.

8. The processing system of claim 1, wherein the SIEC is configured to provide the encrypted data associated with the completion packet to an I/O device associated with the DMA request.

9. A method comprising:
 in response to receiving a memory request at a first slot of a plurality of slots of a storage inline encryption circuit (SIEC), providing the memory request to a memory based on the first slot, wherein each slot of the plurality of slots is associated with a corresponding memory address of the memory; and
 in response to receiving a completion packet from the memory at the first slot of the SIEC, encrypting data associated with the completion packet based on the first slot.

10. The method of claim 9, wherein each slot of the plurality of slots is associated with a corresponding cryptographic key and wherein encrypting the data associated with the completion packet is further based on the cryptographic key associated with the first slot.

11. The method of claim 9, wherein the memory request is received from an attached storage device.

12. The method of claim 9, wherein the memory request is received from a non-volatile memory express (NVMe) device.

13. The method of claim 9, further comprising configuring the first slot of the SIEC based on a command queue of a memory such that the first slot is associated with the memory address of the memory.

14. The method of claim 13, further comprising reconfiguring the first slot of the SIEC based on the command queue in response to a completion indicator being received by the memory.

15. The method of claim 9, further comprising encrypting the data associated with the completion packet further based on an offset associated with the first slot.

16. A processor comprising:
 a storage inline encryption circuit (SIEC) connected to a memory and an I/O device, the SIEC including a plurality of slots each associated with a corresponding memory address of a memory and the SIEC configured to:
  in response to receiving a direct memory access (DMA) request from the I/O device at a first slot of the plurality of slots, decrypt data associated with the DMA request based on the first slot; and
  providing the decrypted data associated with the DMA request to the memory based on the first slot.

17. The processor of claim 16, wherein each slot of the plurality of slots is associated with a corresponding cryptographic key and wherein the SIEC is configured to decrypt the data associated with the DMA request based on the cryptographic key associated with the first slot.

18. The processor of claim 16, wherein the SIEC includes a key table including a plurality of cryptographic keys.

19. The processor of claim 16, wherein the memory includes a command queue storing a command descriptor.

20. The processor of claim 19, wherein the processor is configured to configure the first slot of the SIEC based on the command descriptor.

* * * * *